United States Patent
Seok et al.

(10) Patent No.: US 9,793,966 B2
(45) Date of Patent: Oct. 17, 2017

(54) LINK ADAPTATION METHOD AND APPARATUS IN WIRELESS LAN SYSTEM

(71) Applicant: LG ELECTRONICS INC., Seoul (KR)

(72) Inventors: Yong Ho Seok, Anyang-si (KR); Yu Jin Noh, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 14/510,458

(22) Filed: Oct. 9, 2014

(65) Prior Publication Data

US 2015/0023308 A1    Jan. 22, 2015

Related U.S. Application Data

(63) Continuation of application No. 13/522,483, filed as application No. PCT/KR2010/005464 on Aug. 18, 2010, now Pat. No. 8,886,116.
(Continued)

(51) Int. Cl.
*H04B 7/0452* (2017.01)
*H04B 7/04* (2017.01)
(Continued)

(52) U.S. Cl.
CPC ......... *H04B 7/0452* (2013.01); *H04B 7/0421* (2013.01); *H04B 7/0621* (2013.01); *H04L 5/0053* (2013.01); *H04W 84/12* (2013.01)

(58) Field of Classification Search
None
See application file for complete search history.

(56) References Cited

U.S. PATENT DOCUMENTS 8,526,351 B2   9/2013  Fischer et al.
8,649,456 B2   2/2014  Xia et al.
(Continued)

FOREIGN PATENT DOCUMENTS

EP    1983676    10/2008

OTHER PUBLICATIONS

Richard Van Nee et al., "UL MU-MIMO for 11ac", IEEE 802.11-09/0852-00-00ac, Jul. 2009.
(Continued)

*Primary Examiner* — Kwang B Yao
*Assistant Examiner* — Adam Duda
(74) *Attorney, Agent, or Firm* — Lee Hong Degerman Kang Waimey

(57) ABSTRACT

A link adaptation method performed by a station (STA) in a wireless local area network (LAN) system supporting multi-user multiple-input multiple-output (MU-MIMO) is provided. The method includes: receiving a modulation and coding scheme (MCS) request, a steered sounding physical layer convergence procedure (PLOP) protocol data unit (PPDU) which is beam-formed to the STA, and a MIMO indicator including MU-MIMO-related information from an access point (AP); and transmitting feedback information including an MCS acquired from the steered sounding PPDU and the MU-MIMO-related information to the AP in response to the MCS request.

12 Claims, 12 Drawing Sheets

Related U.S. Application Data

(60) Provisional application No. 61/295,665, filed on Jan. 15, 2010.

(51) Int. Cl.
  *H04B 7/06* (2006.01)
  *H04L 5/00* (2006.01)
  *H04W 84/12* (2009.01)

(56) References Cited

U.S. PATENT DOCUMENTS

| | | |
|---|---|---|
| 2007/0298742 A1 | 12/2007 | Ketchum et al. |
| 2008/0316981 A1 | 12/2008 | Trainin |
| 2009/0316802 A1* | 12/2009 | Tong .................... H04B 7/0452 375/260 |
| 2010/0309834 A1 | 12/2010 | Fischer et al. |
| 2011/0038266 A1* | 2/2011 | Kim .................... H04W 72/042 370/242 |
| 2011/0222473 A1 | 9/2011 | Breit et al. |
| 2011/0235533 A1 | 9/2011 | Breit et al. |
| 2012/0026909 A1 | 2/2012 | Seok |
| 2012/0314570 A1 | 12/2012 | Forenza et al. |

OTHER PUBLICATIONS

Yoshitaka Hara et al., "Spatial Scheduling With Interference Cancellation in Multiuser MIMO Systems", IEEE Transactions on Vehicular Technology, vol. 57, No. 2, Mar. 2008.

* cited by examiner

LINK ADAPTATION METHOD AND APPARATUS IN WIRELESS LAN SYSTEM

CROSS-REFERENCE TO RELATED APPLICATIONS

This application is a continuation of U.S. patent application Ser. No. 13/522,483, filed on Jul. 16, 2012, now U.S. Pat. No. 8,886,116, which is the National Stage filing under 35 U.S.C. 371 of International Application No. PCT/KR2010/005464, filed on Aug. 18, 2010, which claims the benefit of U.S. Provisional Application No. 61/295,665, filed on Jan. 15, 2010, the contents of which are all incorporated by reference herein in their entirety.

TECHNICAL FIELD

The present invention relates to wireless communications, and more particularly, to a link adaptation method in a wireless local area network (LAN) system and an apparatus supporting the method.

BACKGROUND ART

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980. WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed. Furthermore, in order to overcome a limit to the communication speed that was considered as being weakness in the WLAN, IEEE 802.11n has recently been established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. For a necessity for high quality and broadband data transmission according to increased users and in order to reduce transmit power, use radio resources efficiently, and extend the service coverage, the IEEE 802.11n standard supports beamforming technology and data transmission through a maximum of four spatial streams. Furthermore, this standard may use not only a coding scheme for transmitting several redundant copies in order to increase data reliability, but also Orthogonal Frequency Division Multiplex (OFDM) in order to increase the speed.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of 1 Gbps or higher. This is because the IEEE 802.11n MAC/PHY protocol is designed for an operation of a single station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of 1 Gbps or higher in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of 1 Gbps or higher in a MAC service access point (SAP).

The VHT WLAN system allows simultaneous channel access of a plurality of VHT non-AP STAs for the effective use of a radio channel. For this, multi-user multiple input multiple output (MU-MIMO)-based transmission using multiple antennas is supported. A VHT access point (AP) can concurrently transmit spatial-multiplexed data to a plurality of VHT non-AP STAs.

The channel estimation and link adaptation procedure in the conventional IEEE 802.11n WLAN system specifies a channel estimation and link adaptation procedure for a plurality of spatial streams between the AP and the STA. In comparison thereto, a channel estimation and link adaptation procedure is required to transmit data as the suitable number of spatial streams and modulation and coding scheme (MCS) value to each of a plurality of VHT STAs which are paired as a target of MU-MIMO transmission in the VHT WLAN system. There is a need to consider a new protocol for a link adaptation procedure in a WLAN system supporting MU-MIMO.

SUMMARY OF INVENTION

Technical Problem

The present invention provides a link adaptation method and apparatus applicable to a wireless local area network (LAN) system supporting multi-user multiple input multiple output (MU-MIMO) transmission.

Technical Solution

In an aspect, a link adaptation method performed by a station (STA) in a wireless local area network (LAN) system supporting multi-user multiple-input multiple-output (MU-MIMO) is provided. The method includes: receiving a modulation and coding scheme (MCS) request, a steered sounding physical layer convergence procedure (PLOP)

protocol data unit (PPDU) which is beam-formed to the STA, and a MIMO indicator including MU-MIMO-related information from an access point (AP); and transmitting feedback information including an MCS acquired from the steered sounding PPDU and the MU-MIMO-related information to the AP in response to the MCS request.

The steered sounding PPDU may include a PLOP header, and the steered sounding PPDU may be indicated by a sounding field in the PLOP header.

The MIMO indicator may indicate the number of paired STAs which are targets of MU-MIMO transmission together with the STA.

The MIMO indicator may be transmit power information for the STA in MU-MIMO transmission.

The MIMO indicator may further include information regarding the total number of spatial streams used by the AP in MU-MIMO transmission and the number of spatial streams assigned to the STA.

The method may further include: receiving from the AP a training request message (TRQ) requesting transmission of a sounding PPDU for channel estimation between the AP and the STA; and transmitting a sounding PPDU in response to the TRQ. The steered sounding PPDU may be beam-formed by using a precoding matrix determined from the sounding PPDU.

The feedback information may further include information regarding the number of spatial streams, determined from the steered sounding PPDU and the MU-MIMO related information.

The method may further include transmitting a sounding PPDU to the AP together with the feedback information.

The sounding PPDU may be beam-formed by using a precoding matrix acquired from the steered sounding PPDU.

The method may further include: receiving full-dimension channel information between the AP and the STA from the AP; and transmitting an MCS value for a case of assuming single user (SU)-MIMO transmission between the AP and the STA on the basis of the full-dimension channel information.

Advantageous Effects

The present invention provides a link adaptation method applicable to a wireless local area network (WLAN) system supporting multi-user multiple input multiple output (MU-MIMO), and allows an optimal modulation and coding scheme (MCS) to be configured adaptively for a channel situation and transmit power for each of paired stations (STAs) in a MU-MIMO transmission environment. Accordingly, power consumption can be decreased, and reliability of data transmission can be increased.

MODE FOR INVENTION

Hereinafter, embodiments of the present invention will be described with reference to the accompanying drawings. Embodiments of the present invention described below can be effectively applied to a very high throughput (VHT) wireless local area network (WLAN) system supporting multi-user multiple input multiple output (MU-MIMO). Although the VHT WLAN system will be described hereinafter for example, the technical features of the present invention are not limited thereto. Thus, the link adaptation method proposed in the present invention is equally applicable to a wireless communication system supporting frame transmission based on a MU-MIMO scheme.

Figure 1:
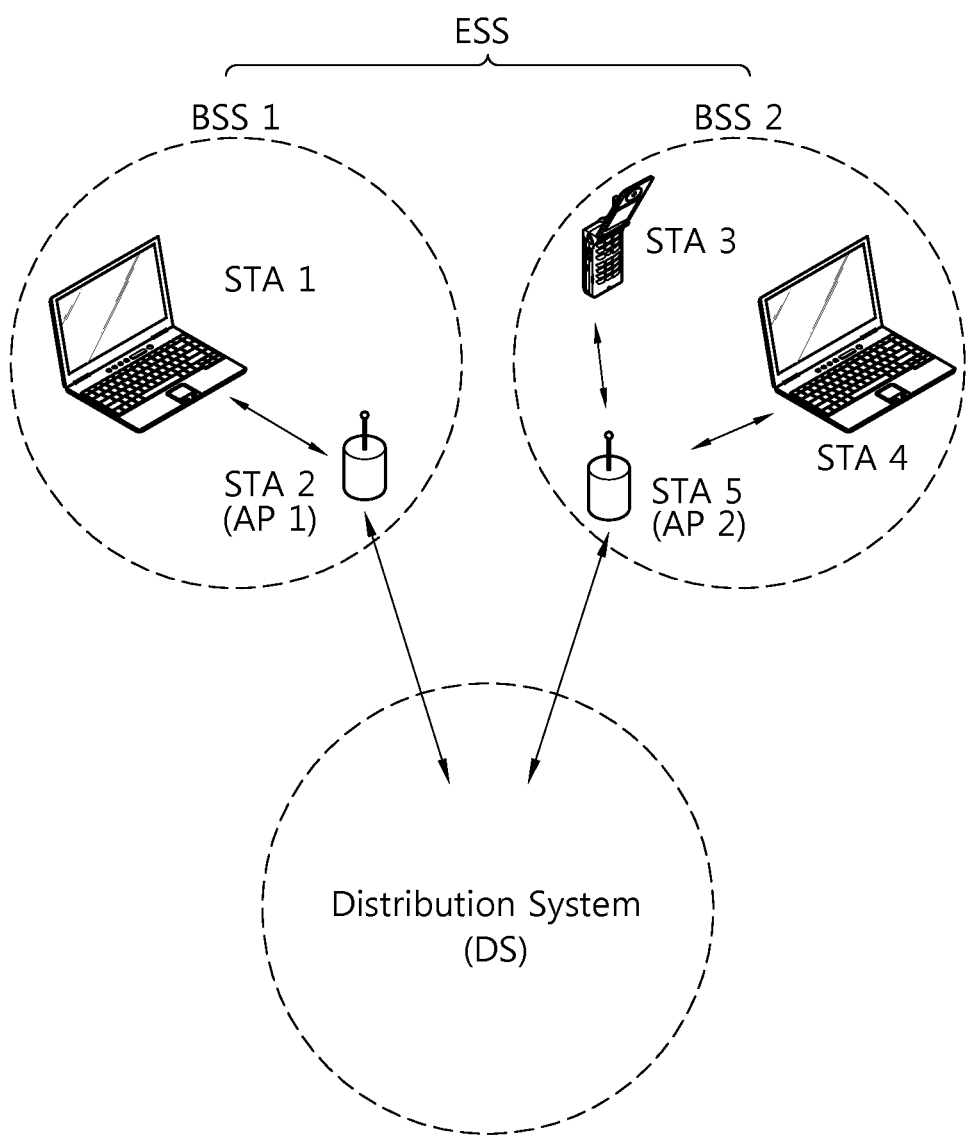
FIG. 1 is a schematic view showing an exemplary structure of a wireless local area network (LAN) system to which an embodiment of the present invention can be applied.

FIG. 1 is a schematic view showing an exemplary structure of a WLAN system to which an embodiment of the present invention can be applied.

Referring to FIG. 1, the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports the super high-speed data processing of 1 GHz or higher in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

Among the STAs, non-AP STAs (i.e., STA1, STA3, STA4, STAG, STA7, and STA8) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-speed data processing of 1 GHz or higher in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports MU-MIMO transmission described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

In the following description of the present invention, transmission of the spatially multiplexed data to a plurality of STAs is referred to as SDMA transmission. To perform SDMA transmission by allowing the plurality of STAs to simultaneously access a channel, the STAs may simultaneously perform transmission through a plurality of spatial streams by using respective multiple antennas. Multi-user multiple input multiple output (MU-MIMO) is a method in which each of a plurality of STAs employing multiple antennas simultaneously transmits and/or receives an independent data stream. Downlink (DL) MU-MIMO implies that one STA performs MU-MIMO transmission to a plurality of receiving STAs. In this case, one transmitting STA may be an AP, and a plurality of receiving STAs may be non-AP STAs. Hereinafter, when a plurality of STAs are paired, it implies that the STAs are paired as target STAs of MU-MIMO transmission, and paired STAs are STAs paired as transmission target STAs of MU-MIMO.

Figure 2:
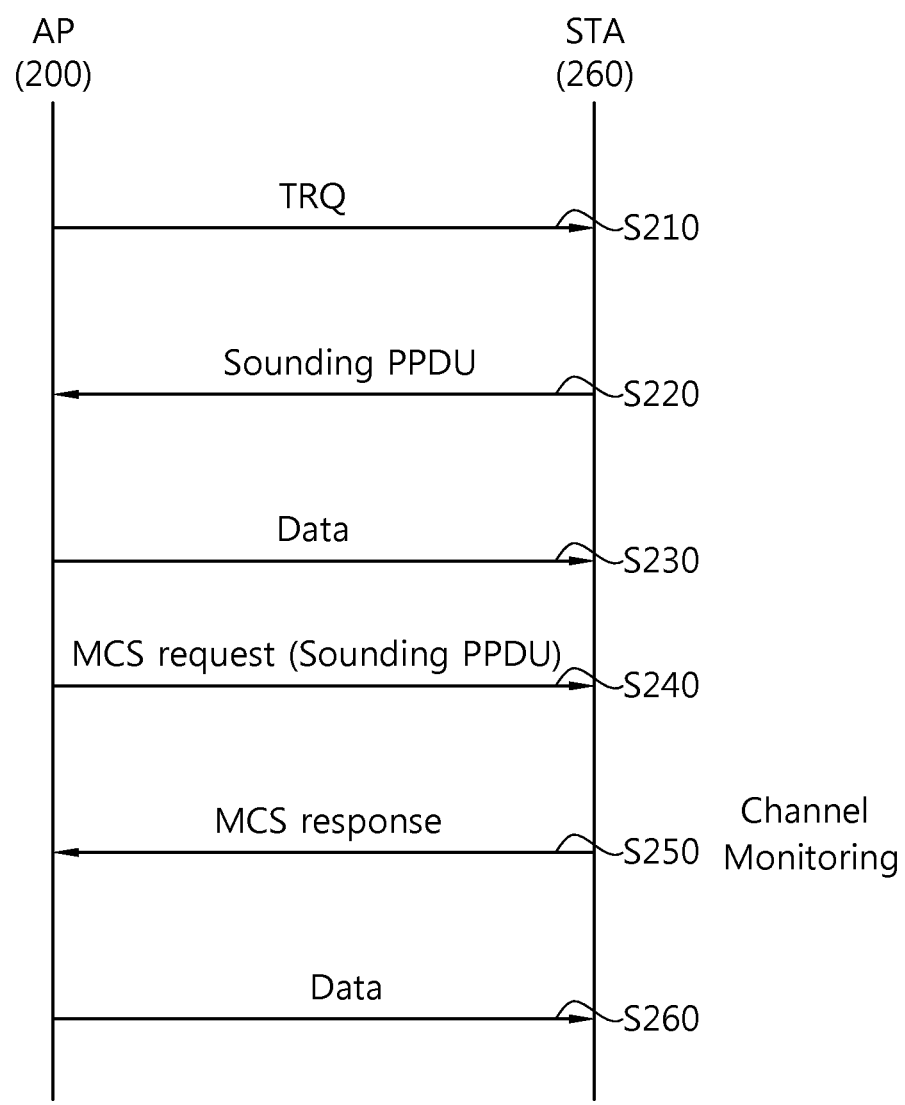
FIG. 2 is a message flow chart showing an example of a channel estimation and link adaptation procedure used in multiple input multiple output (MU-MIMO) transmission.

FIG. 2 is a message flow chart showing an example of a channel estimation and link adaptation procedure used in MIMO transmission.

The example of FIG. 2 is a case in which an AP 200 transmits data to an STA 260. The AP 200 must know a channel environment with respect to the STA 260 which intends to transmit data in order to determine a modulation and coding scheme (MCS) and the number of spatial streams suitable for data transmission. Before data transmission, the channel estimation and link adaptation procedure is required to determine the MCS, the number of spatial streams to be used in data transmission, etc.

In the example of channel estimation and link adaptation of FIG. 2, when the AP 200 transmits a training request (TRQ) to the STA (S210), the STA transmits a sounding PPDU to the AP in response to the TRQ (step S220). The AP estimates channel information on the basis of the received sounding PPDU, and transmits data to the STA by determining the MCS and the number of spatial streams suitable for the channel information (step S230).

When the STA has capability of sending a feedback to the AP through an MCS selection process, a procedure for determining an MCS value suitable for data transmission can be performed. When the AP 200 transmits an MCS request (MRQ) to the STA 260 together with a sounding PPDU (step S240), the STA 260 selects the suitable number of spatial streams and MCS through channel estimation and transmits an MCS response to the AP 200 (step S250). In this case, MCS information suitable for a channel situation is included in the MCS response, and the MCS response is also called an MCS feedback (MFB). The AP 200 may determine the MCS value on the basis of the MFB received from the STA 260, and may transmit data subjected to modulation and coding by applying the determined MCS value (step S260). In this case, the sounding PPDU transmitted together with the MCS request is used so that the AP 200 transmits full-dimension information to the STA 260, and allows the STA 260 to be able to transmit a correct feedback to the AP 200. When the MCS request is transmitted together with the sounding PPDU, the sounding PPDU may be transmitted in a format which includes a field for indicating whether the MCS is requested (or indicating that the MCS feedback is requested), or the MCS request and the sounding PPDU may be transmitted through separate frames. Hereinafter, unless specified otherwise, the aforementioned two cases are included when it is said that the MCS request and the sounding PPDU (or a steered sounding PPDU) are transmitted together.

Figure 3:
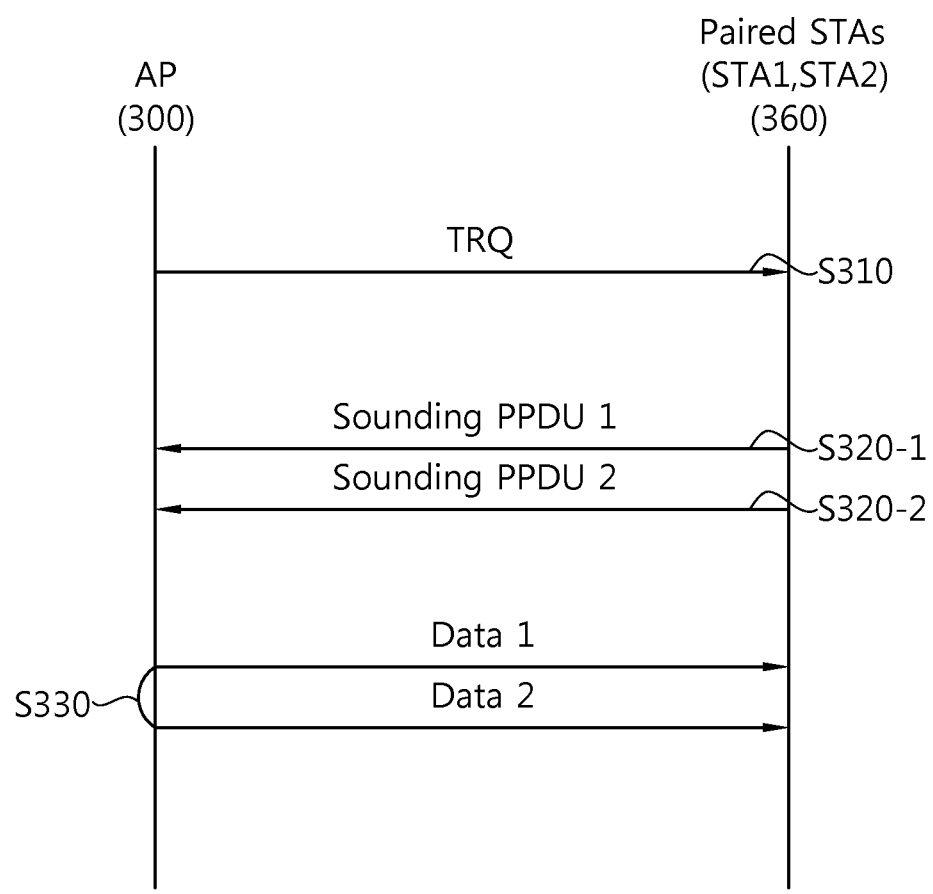
FIG. 3 shows an example of a channel estimation method for MU-MIMO transmission.

FIG. 3 shows an example of a channel estimation method for MU-MIMO transmission.

In the example of FIG. 3, an AP 300 intends to transmit data to paired STAs 360. The AP 300 transmits a TRQ to the paired STAs 360 (step S310). In this case, the TRQ may include a list of paired STAs requiring a response (i.e., an STA1 and an STA2 in the example of FIG. 3) and an order of sounding PPDU responses of the STA1 and the STA2. Upon receiving the TRQ, the STA1 transmits a sounding PPDU1 to the AP 300 (step S320-1), and the STA2 transmits a sounding PPDU2 to the AP 300 (step S320-2).

The AP 300 can perform channel estimation on the basis of the received sounding PPDU1 and sounding PPDU2. An MCS and/or the number of spatial streams to be used for data transmission with respect to each of paired STAs and suitable for a channel situation can be determined according to a result of channel estimation. The AP 300 transmits data 1 and data 2 through MU-MIMO transmission with respect to the paired STAs by using the determined MCS and/or the number of spatial streams (step S330). In the example of FIG. 3, transmission of the data 1 and transmission of the data 2 are depicted by being aggregated with a symbol "⊂", which implies that the data 1 and the data 2 are simultaneously transmitted. In other words, the data 1 and the data 2 are transmitted through MU-MIMO transmission with respect to the paired STA1 and STA2. Hereinafter, a procedure of transmitting data or messages aggregated with the symbol "⊂" also implies a procedure in which transmissions/operations are performed simultaneously through MU-MIMO transmission.

A link adaptation procedure specified in the conventional IEEE 802.11n standard premises MIMO transmission for a single STA, that is, single user (SU)-MIMO transmission. In the conventional link adaptation procedure, a feedback is performed under the assumption that transmit power of the AP is entirely used by the single STA in case of SU-MIMO. However, since several STAs can simultaneously receive data from the AP in case of MU-MIMO, transmit power that can be used by each of paired STAs is decreased to that extent. That is, an MCS and the number of spatial streams to be used in data transmission for each STA may differ according to the number of paired STAs. As such, in the link adaptation procedure for MU-MIMO transmission, there is a need to perform the link adaptation procedure by considering that a destination STA of data transmission is not a single STA but a plurality of STAs. That is, the link adaptation procedure needs to allow each of paired STAs to transmit an MFB to the AP by considering transmit power distributed to each of paired STAs.

According to the embodiment of the link adaptation procedure proposed in the present invention, a MIMO indicator is further transmitted together with the MCS request so that an STA that must transmit the MFB upon receiving the MCS request can know transmit power distributed to the STA.

The MIMO indicator according to the embodiment of the present invention includes transmit power information for an STA which receives the MCS request and/or information regarding the number of STAs paired for MU-MIMO transmission. As an example of the MIMO indicator, a power indicator (PI) including transmit power information for an STA in MU-MIMO transmission will be described hereinafter. However, the PI is only one example of the MIMO indicator. Thus, in the following example, the PI may be replaced with information regarding the number of paired STAs or may further include information regarding the number of paired STAs.

Upon receiving the MCS request, the STA can recognize information regarding transmit power distributed to the STA in MU-MIMO transmission on the basis of the PI by receiving the PI together with the MCS request, and can use the information to determine an MCS value included in the MFB. The PI may include information regarding the number of STAs paired for MU-MIMO transmission and/or transmit power information for each of the paired STAs. In addition, the PI may further include information indicating the total number of spatial streams used by the AP in MU-MIMO transmission and information regarding the number of spatial streams assigned for each of the paired STAs.

Upon receiving the PI, the STA can know the information regarding transmit power distributed to the STA or the number of STAs paired for MU-MIMO including the STA. In addition, the STA can know the number of spatial steams to be used by the AP in MU-MIMO transmission and can also know how many spatial streams are assigned to the STA among the spatial streams.

Hereinafter, the link adaptation method in which the AP supporting MU-MIMO transmission transmits the PI to the paired STAs and performs the link adaptation procedure adaptively to a change of a channel environment will be described according to detailed embodiments. The link adaptation method based on the present invention allows a proper feedback considering a MU-MIMO characteristic in which data is simultaneously transmitted for a plurality of STAs.

Figure 4:
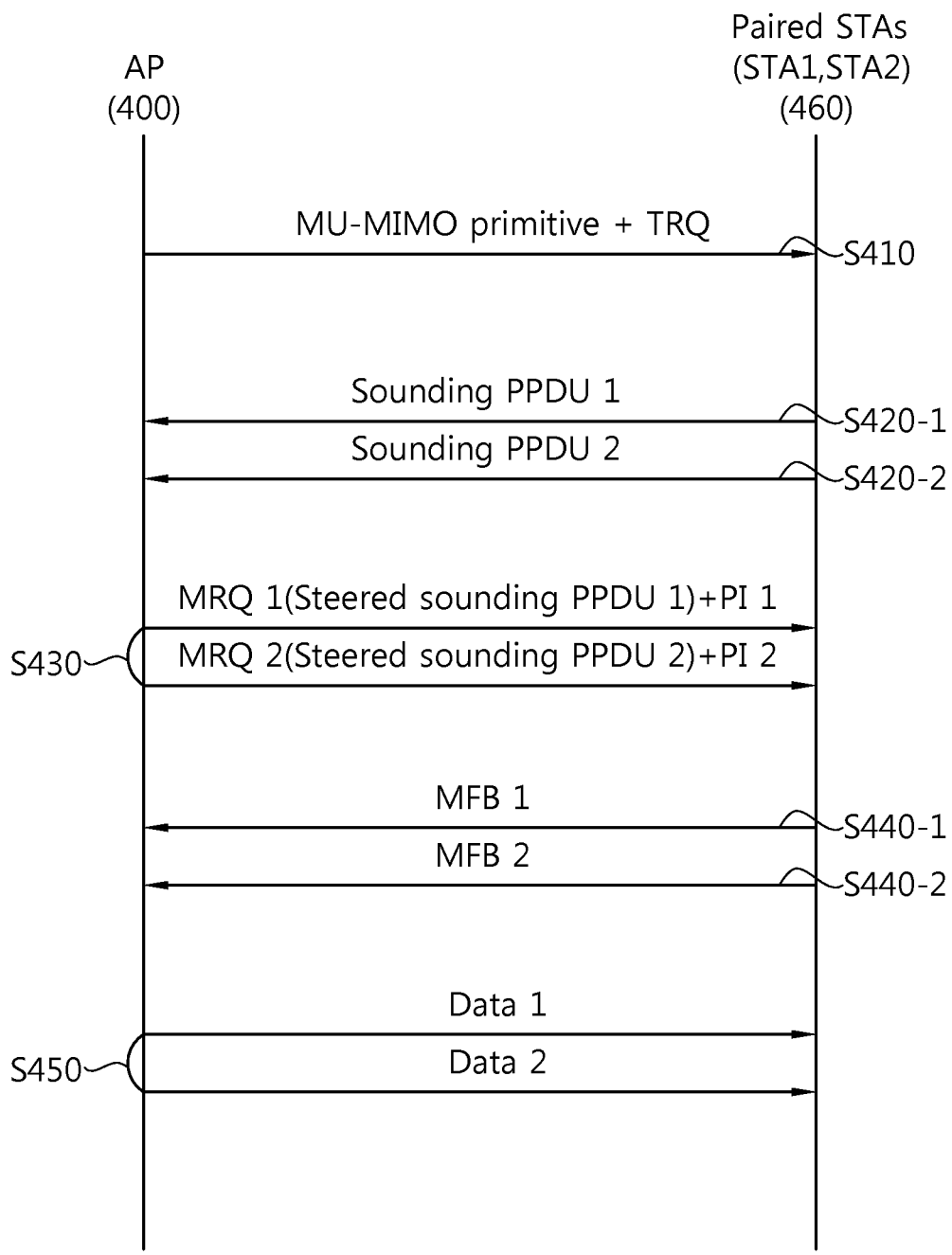
FIG. 4 is a message flow chart of a link adaptation procedure according to an embodiment of the present invention.

FIG. 4 is a message flow chart of a link adaptation procedure according to an embodiment of the present invention.

An AP 400 transmits to a plurality of destination STAs 460 which are targets of MU-MIMO transmission a TRQ and a MU-MIMO primitive for reporting that a procedure for MU-MIMO transmission will start (step S410). Upon receiving the TRQ, each of paired STAs (i.e., STA 1 and STA 2) 460 transmits a sounding PPDU to the AP 400. That is, in the example of FIG. 4, the STA 1 transmits a sounding PPDU 1 (step S420-1), and the STA 2 transmits a sounding PPDU 2 (step S420-2).

For link adaptation, the AP transmits an MRQ 1 and an MRQ 2 to the STA 1 and the STA 2, and in this case, a PI 1 and a PI 2 are transmitted together, respectively (step S430). The MRQ can be transmitted together with a steered sounding PPDU. In this case, a precoding vector multiplied by the steered sounding PPDU is a beamforming vector which forms a beam used by the AP in MU-MIMO transmission. The precoding vector and the beamforming vector are also called a precoding matrix and a beamforming matrix, respectively, and hereinafter will be referred to as the precoding vector and the beamforming vector.

When transmitting the MRQ 1 and the MRQ 2 respectively to the STA 1 and the STA 2, the AP 400 transmits a steered sounding PPDU which is precoded with a beamforming vector to be used for beamforming in next MU-MIMO transmission, so that the paired STAs 460 can estimate a channel situation in a MU-MIMO transmission environment in which data is actually transmitted and can transmit an MFB by determining an MCS value on the basis of the estimated channel situation. In other words, the paired STAs are allowed to determine an MCS feedback by considering an influence of a beam formed in the process of performing MU-MIMO transmission by the AP. The STA can transmit the MFB to another STA by considering a beamforming vector to be used in MU-MIMO transmission and acquired by receiving the steered sounding PPDU.

The PI transmitted together with the steered sounding PPDU includes information regarding the number of paired STAs or information regarding transmit power distributed to the STA. The STA can determine the MCS by considering the PI, and can transmit the determined MCS to the AP by using the MFB.

The paired STA 460 transmits the MFB 1 and the MFB 2 to the AP in response to the MRQ (steps S440-1 and S440-2). The AP determines the MCS on the basis of the received MFB 1 and MFB 2, and transmits data through MU-MIMO according to the determined MCS (step S450).

Figure 5:
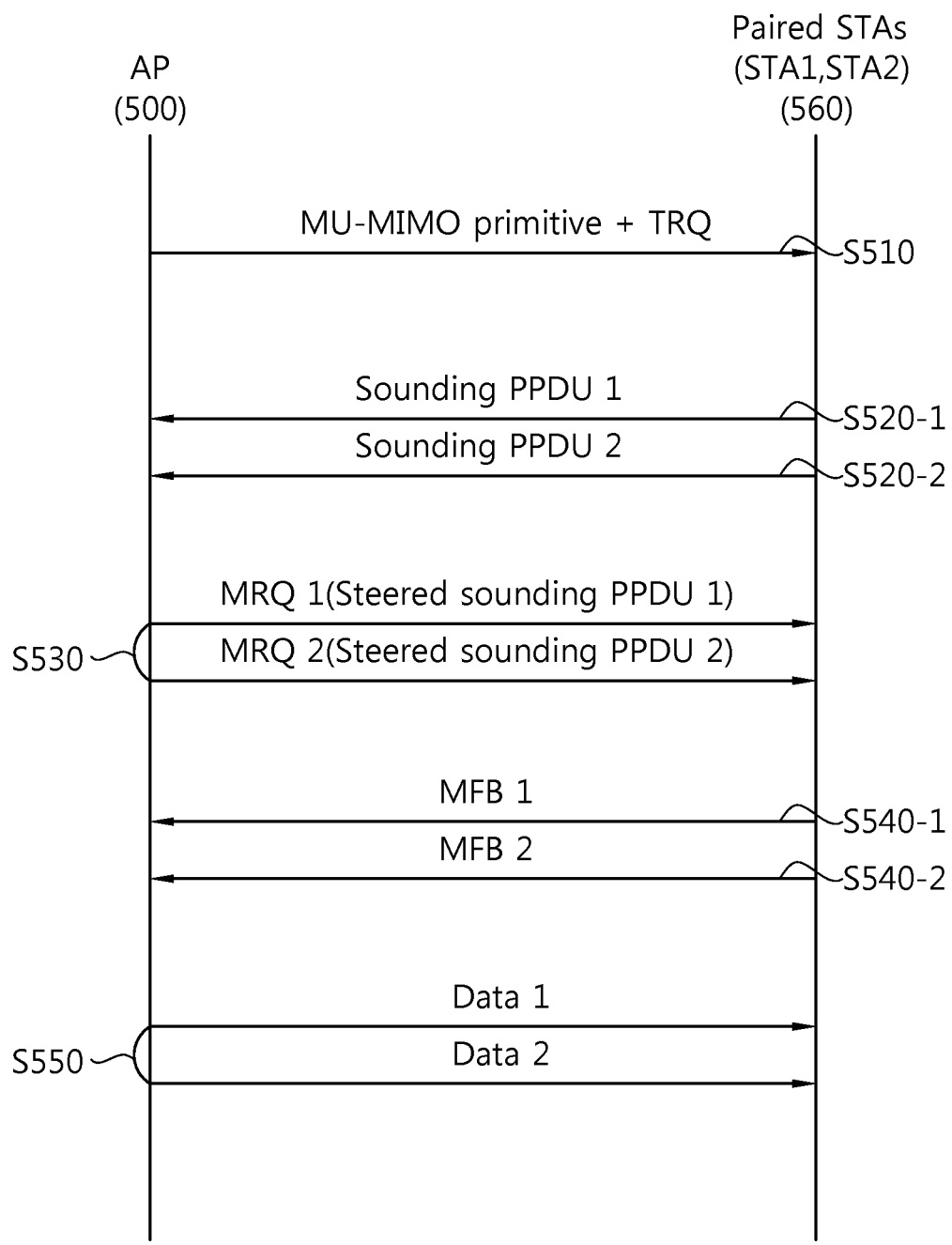
FIG. 5 is a message flow chart of a link adaptation procedure according to an embodiment of the present invention.

FIG. 5 is a message flow chart of a link adaptation procedure according to another embodiment of the present invention.

Similarly to the example of FIG. 4, an AP 500 transmits to a plurality of destination STAs 560 which are targets of MU-MIMO transmission a TRQ and a MU-MIMO primitive for reporting that a procedure for MU-MIMO transmission will start (step S510). Each of paired STAs 560 which receive the TRQ transmits a sounding PPDU to the AP 500. That is, in the example of FIG. 5, the STA 1 which is a paired STA transmits a sounding PPDU 1 (step S520-1), and the STA 2 transmits a sounding PPDU 2 (step S520-2).

Upon receiving the sounding PPDU 1 and the sounding PPDU 2 from the STA 1 and the STA 2, the AP 500 transmits an MRQ 1 and an MRQ 2 for link adaptation to the STA 1 and the STA 2. Similarly to the example of FIG. 4, the MRQ can be transmitted using a steered sounding PPDU. In this case, the PI can be transmitted by being included in the steered sounding PPDU. That is, unlike the example of FIG. 4, PI information can be included as a coefficient to a precoding vector multiplied by the steered sounding PPDU. In other words, the precoding vector multiplied by the steered sounding PPDU may be a matrix obtained by multiplying the PI information as a coefficient by a beamforming vector for beamforming used by the AP in MU-MIMO transmission. The PI can be transmitted independently from an MRQ transmitted using the steered sounding PPDU as in the example of FIG. 4 or can be transmitted as a part of it by being included in the steered sounding PPDU as in the example of FIG. 5.

Although the embodiment of the present invention described hereinafter is an embodiment in which the PI information is transmitted independently from the MRQ, this is for exemplary purposes only. Thus, as described in the example of FIG. 5, the PI information can be transmitted by being included in the steered sounding PPDU used in MRQ transmission, which is also applicable to the following descriptions.

Upon receiving the MRQ, the STA 1 receives the steered sounding PPDU 1, acquires PI information and a beamforming vector from a precoding vector of the steered sounding PPDU 1, determines an MCS by considering the PI information and the beamforming vector, and transmits an MFB 1 to the AP 500 (step S540-1). Likewise, upon receiving the MRQ, the STA 2 receives the steered sounding PPDU 2, acquires PI information and a beamforming vector from a precoding vector of the steered sounding PPDU 2, determines an MCS by considering the PI information and the beamforming vector, and transmits an MFB 2 to the AP 500 (step S540-2). In this case, information regarding the number of spatial streams to be used in transmission suitable for a channel situation can be included in the MFB 1 and the MFB 2.

The AP 500 determines the MCS and the number of spatial streams on the basis of the MFB 1 and the MFB 2, and transmits data 1 and data 2 to the STA 1 and the STA 2 by applying/using the determined MCS and the number of spatial streams (step S550).

Figure 6:
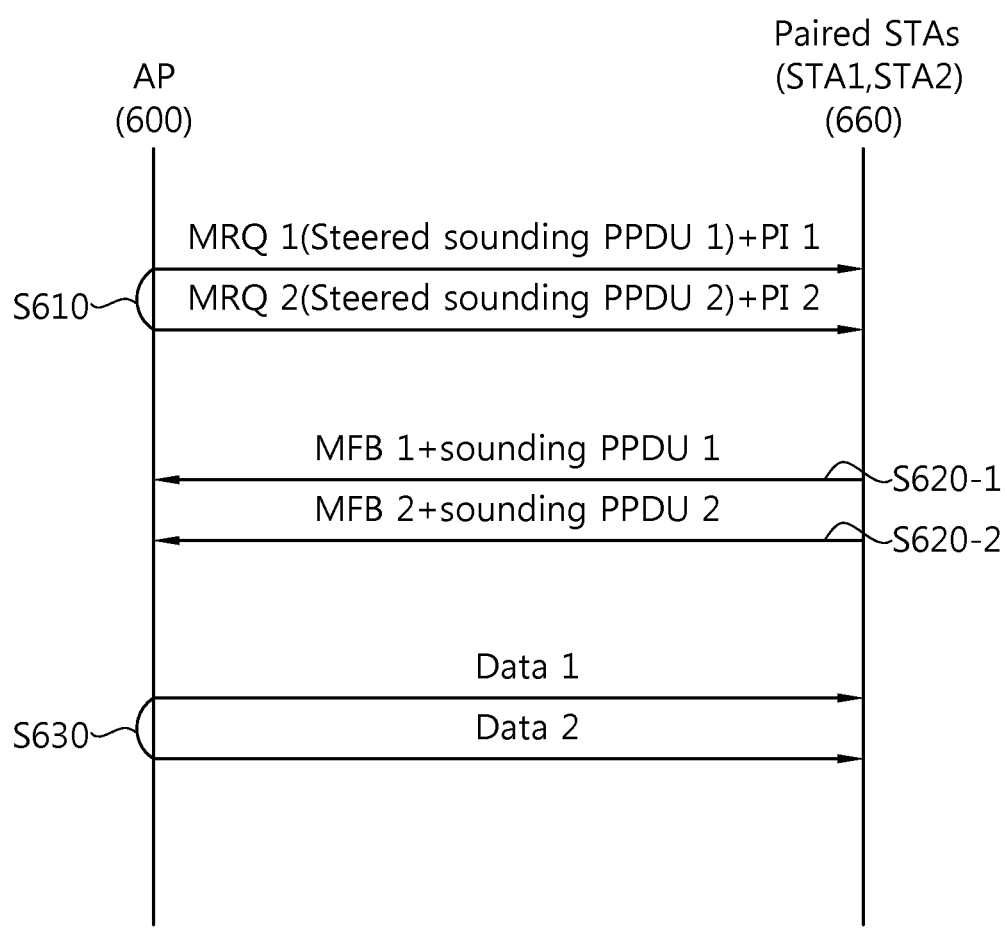
FIG. 6 is a message flow chart of a link adaptation procedure according to an embodiment of the present invention.

FIG. 6 is a message flow chart of a link adaptation procedure according to another embodiment of the present invention.

An example of the link adaptation procedure of FIG. 4 and FIG. 5 is a protocol including all procedures required when an AP performs link adaptation on paired STAs. However, if a channel situation does not change frequently, it may effective to operate the link adaptation by using a minimum protocol. The link adaptation method of FIG. 6 shows an example of a link adaptation procedure in which an AP 600 and paired STAa 660 transmit data through a link establishment and adaptation procedure, and can apply it when intended to use the link adaptation procedure to transmit data at a later time.

After transmitting the data using MU-MIMO transmission through the link adaptation procedure, the AP 600 transmits again an MRQ to the paired STAs 660 to achieve link adaptation for MU-MIMO transmission (step S610). The AP 600 transmits the MRQ together with a PI under the assumption that a channel environment does not change. The MRQ can be transmitted through a steered sounding PPDU. In this case, a precoding vector used for the steered sounding PPDU is a beamforming vector used to form a beam for previously transmitted data.

In response to MRQ transmission of step S610, the STA 1 transmits the MFB 1 (step S620-1), and the STA 2 transmits the MFB 2 (step S620-2). In this case, the paired STAs (i.e., STA 1 and STA 2) 660 can transmit a sounding PPDU together with the MFB 1 and the MFB 2 in order to report full-dimension channel information.

The AP 600 can know an extent of channel change by using the sounding PPDU received together with the MFB. If the channel is not much changed from previous data transmission, data can be transmitted by determining/applying an MCS and the number of spatial streams on the basis of the MCS and the number of spatial streams of the MFB 1 and MFB 2 fed back from the STA 1 and the STA 2 (step S630).

However, if the AP 600 measures a channel of the sounding PPDU received together with the MFB and the result of measurement shows that a channel environment changes in the meantime, the MFB 1 and MFB 2 which are determined by receiving a steered sounding PPDU on the basis of the channel environment in previous data transmission may be not suitable for the changed channel environment. An embodiment of the link adaptation procedure applicable to this situation is described below with reference to FIG. 7.

Figure 7:
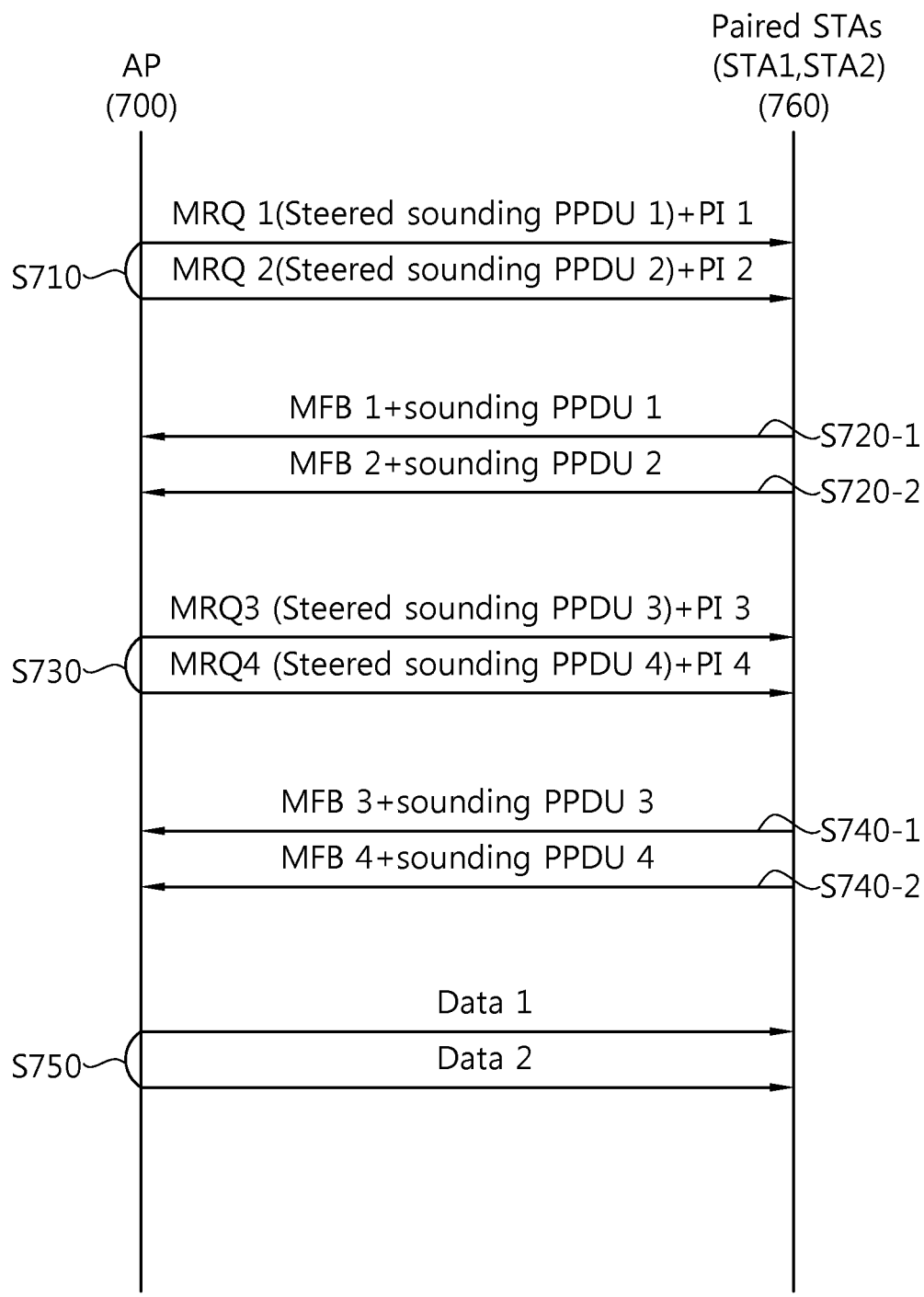
FIG. 7 is a message flow chart of a link adaptation procedure according to an embodiment of the present invention.

FIG. 7 is a message flow chart of a link adaptation procedure according to another embodiment of the present invention.

Steps S710, S720-1, and S720-2 of FIG. 7 are the same as steps S610, S620-1, and S620-2 of FIG. 6. However, the embodiment of FIG. 7 shows an example of a link adaptation procedure in which an AP 700 knows that a channel situation is changed from previous data transmission, by using a sounding PPDU 1 and sounding PPDU 2 received together with an MFB 1 and an MFB 2 in steps S720-1 and S720-2.

According to a result of channel estimation using a sounding PPDU received together with an MFB from the STA 1 and the STA 2 which are exemplified as paired STAs 760, if the AP 700 knows that a channel situation is changed from a channel situation of previous data transmission, the AP 700 transmits again the MRQ and a PI to the STA 1 and the STA 2 (step S730). This is because, if the channel situation is changed, a steered sounding PPDU 1 and steered sounding PPDU 2 transmitted to the STA 1 and the STA 2 on the basis of a channel situation of previous data transmission are no longer suitable for a current channel situation, and an MFB 1 and MFB 2 determined based on the steered sounding PPDU 1 and steered sounding PPDU 2 not suitable for the current channel situation are not suitable for the current channel situation, either. Therefore, for new link adaptation, the AP transmits an MRQ through a steered PPDU 3 and steered PPDU 4 which are re-steered by considering a result of performing channel estimation by using the sounding PPDU 1 and sounding PPDU 2 received in steps S720-1 and S720-2, and also transmits a PI 3 and PI 4 re-steered in the same manner (step S730). In this case, a precoding vector used in the steered PPDU 3 and the steered PPDU 4 is a transmission (Tx) vector of a channel measured by using the sounding PPDU 1 and sounding PPDU 2 transmitted in steps S730-1 and S730-2.

The STA 1 transmits an MFB 3 and a sounding PPDU 3 to the AP in response to an MRQ (i.e., a steered sounding PPDU 3) (step S740-1), and the STA 2 transmits an MFB 4 and a sounding PPDU 4 to the AP in response to an MRQ (i.e., a steered sounding PPDU 4) (step S740-2).

If it is determined that a channel is not much changed as a result of channel estimation based on the sounding PPDU 3 and sounding PPDU 4 received in steps S 740-1 and S740-2, the AP determines an MCS according to the MFB 3 and MFB 4 received in step S 740-1 and S740-2 and transmits data 1 and data 2 (step S750).

The link adaptation procedure shown in the example of FIG. 7 is effectively applicable to any one transmission opportunity (TXOP) duration. For one example, in case of a TXOP holder in which the STA1 and STA 2 of FIG. 7 obtain the TXOP, other STAs except for the STA 1 and the STA 2 defer medium access during the TXOP duration. Therefore, while repetitively operating data transmission and the link adaptation procedure of FIG. 7 between the STA 1 and the STA 2 exemplified as the paired STAs 760 during the TXOP duration, the AP can effectively support MU-MIMO link adaptation.

Figure 8:
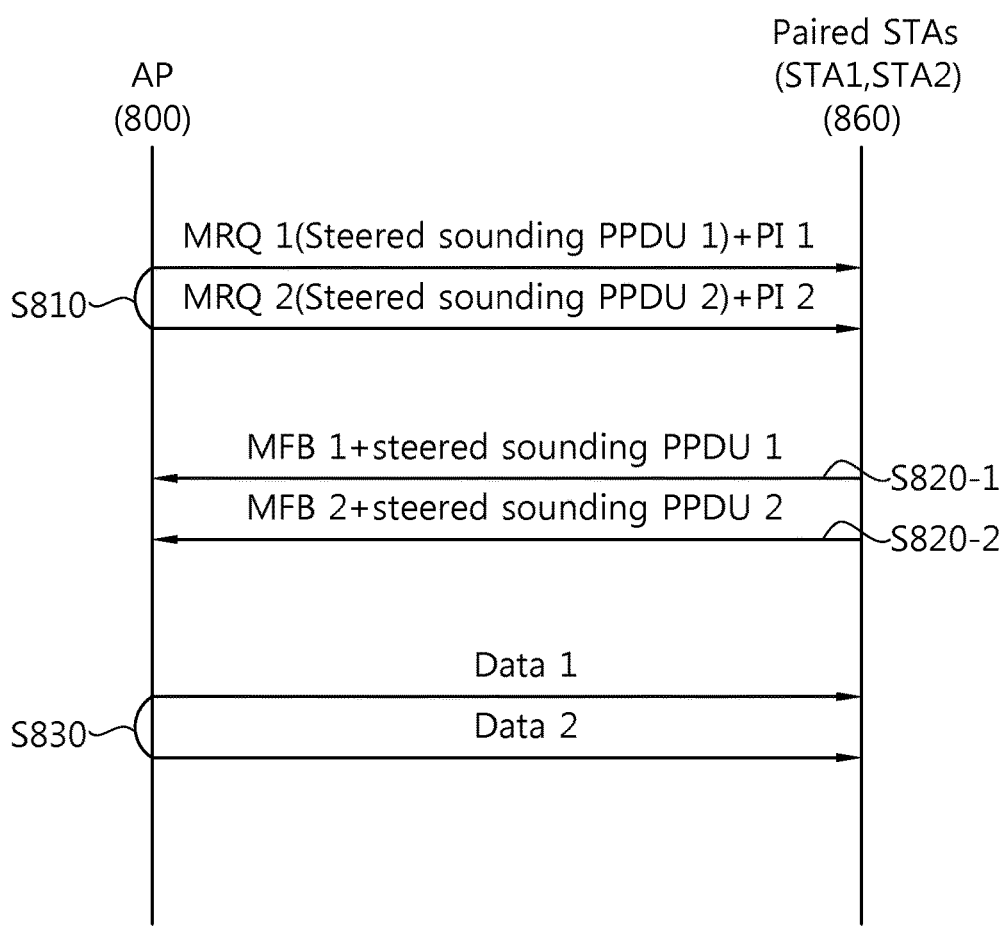
FIG. 8 is a message flow chart of a link adaptation procedure according to an embodiment of the present invention.

FIG. 8 is a message flow chart of a link adaptation procedure according to another embodiment of the present invention.

An example of FIG. 8 is an example of a link adaptation procedure when a persistent link adaptation is not used. Unlike FIG. 6, each of MU-MIMO paired STAs (i.e., STA 1 and STA 2) 860 can transmit a steered sounding PPDU 1 and a steered sounding PPDU 2 to an AP while transmitting an MFB 1 and an MFB 2 to the AP. This is because, if the number of transmit (Tx) antennas of the AP is greater than the number of receive (Rx) antennas of all STAs, the AP cannot properly form a beam since a null space is not sufficient between the AP and the STA.

Figure 9:
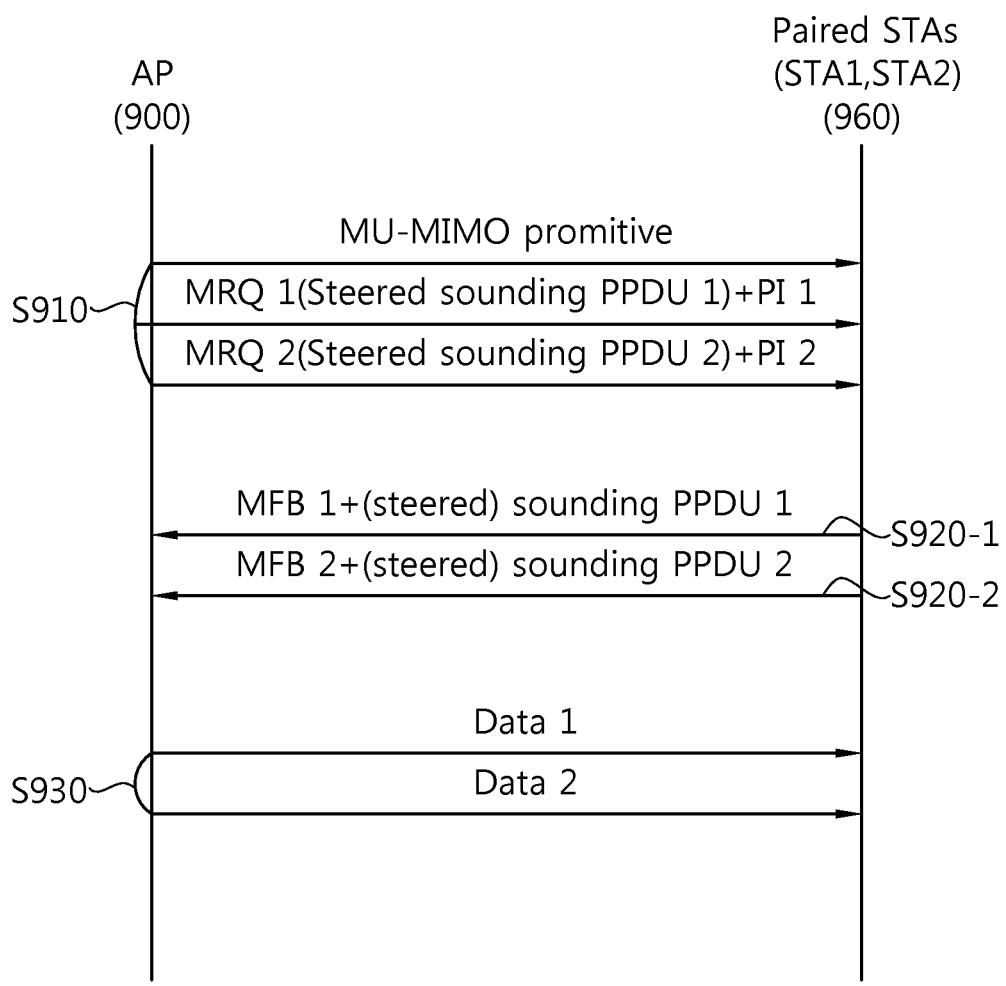
FIG. 9 is a message flow chart of a link adaptation procedure according to an embodiment of the present invention.

FIG. 9 is a message flow chart of a link adaptation procedure according to another embodiment of the present invention.

Referring to FIG. 9, an AP can transmit a MU-MIMO primitive, an MRQ, and a PI to an STA 1 and an STA 2 (step S910). In this case, the MU-MIMO primitive is transmitted in a format that can be recognized by all STAs in a BSS. The MU-MIMO primitive may include information regarding a MU-MIMO transmission time, a transmission duration, etc. HT STAs and legacy STAs not supporting MU-MIMO can know that MU-MIMO transmission will be achieved though the MU-MIMO primitive, and can defer channel access by configuring a network allocation vector (NAV) while MU-MIMO transmission is performed.

When channel access of the STA is regulated by a hybrid coordination function (HCF) of the IEEE 802.11 standard, TXOP can be configured in an enhanced distributed channel access (EDCA) which is a contention-based channel access method of the HCF or a contention-free-based HCF controlled channel access (HCCA) method. When the TXOP is assigned to a certain STA, only an STA (i.e., a TXOP holder) to which the TXOP is assigned during a corresponding TXOP duration can transmit/receive data by accessing a channel. During the TXOP duration, not only legacy STAs but also STAs irrelevant to a MU-MIMO operation defer channel access by configuring an NAV. In the embodiment of the present invention exemplified in FIG. 9, a TXOP configuration based on the HCF can also be used. When the STA 1 and the STA 2 obtain TXOP (e.g., EDCA TXOP, HCCA TXOP, polled TXOP) and thus become TXOP holders, the remaining STAs except for the STA 1 and the STA 2 configure an NAV during a TXOP duration, and defer channel access.

An MRQ 1 which is transmitted simultaneously with a MU-MIMO primitive is transmitted together with a steered sounding PPDU. In this case, the steered sounding PPDU is a value multiplied by a beam vector/matrix in previous TXOP.

The STA 1 receives a steered sounding PPDU 1 and a PI 1, determines an MCS value based on this, and transmits the determined MCS value to the AP (step S920-1). The MFB 1 may further include information regarding the number of spatial streams suitable for a channel situation. In this case, a sounding PPDU or a steered sounding PPDU is transmitted together with the MFB 1. The AP can know a change of the channel situation by using the sounding PPDU or the steered sounding PPDU. The AP determines an MCS value of data to be transmitted to the STA 1 by using the received MFB 1, and transmits data 1 by applying the determined MCS. The aforementioned link adaptation procedure of the AP and the STA 1 is also equally applicable between the AP and the STA 2.

In the aforementioned link adaptation procedure according to the embodiment of the present invention, the AP transmits a sounding PPDU to MU-MIMO paired STAs and thus reports full-dimension channel information including channel information for all spatial streams used by the AP in MU-MIMO transmission. Each of the paired STAs which receive the sounding PPDU can feed back the suitable number of spatial streams and MCS information on the basis of the full-dimension channel information.

In this case, in order to provide the full-dimension channel information, an extended long training field (LTF) must be transmitted to each STA. For example, it is assumed that the AP performs MU-MIMO transmission to the STA 1 and the STA 2 by using four spatial streams, and among the four spatial streams, uses two spatial streams in transmission to the STA 1 and the remaining two spatial streams in transmission to the STA 2. In this case, as a result of beamforming for MU-MIMO transmission to the STA 1 and the STA 2, the STA 1 and the STA 2 may not be able to recognize data LTFs of the counterpart STA, or may not be able to receive the data LTFs due to severe interference. In this case, the AP can additionally transmit the extended LTF so that each of the paired STAs can obtain the full-dimension channel information.

As an example of transmitting the full-dimension channel information by the AP to each of the paired STAs, a null data packet (NDP) specified in the IEEE 802.11n Std. and not including a data field can be used. The AP can additionally transmit an NDP frame including full channel information while transmitting an MRQ and a PI to the STA. In this case, information indicating that the extended LTF is additionally transmitted can be transmitted by containing the information in an SIG field of a PLOP header of the NDP frame.

It has been described up to now that, as one of target STAs of MU-MIMO transmission, the STA determines an MCS value and transmits an MFB to the AP under the assumption that data is received through MU-MIMO transmission. According to another embodiment of the present invention, the STA may transmit to the AP an MFB further including an MCS value when the AP performs SU-MIMO transmission for the AP itself, in addition to the MCS value used when MU-MIMO transmission is assumed. In other words, an MCS value suitable for a case of using MU-MIMO transmission in a current channel situation and an MCS value suitable for a case of using SU-MIMO transmission can be transmitted to the AP. By comparing a case of assuming MU-MIMO transmission with a case of assuming SU-MIMO transmission, the AP can determine an MCS and a spatial stream of data to be transmitted to the STA.

Figure 10:
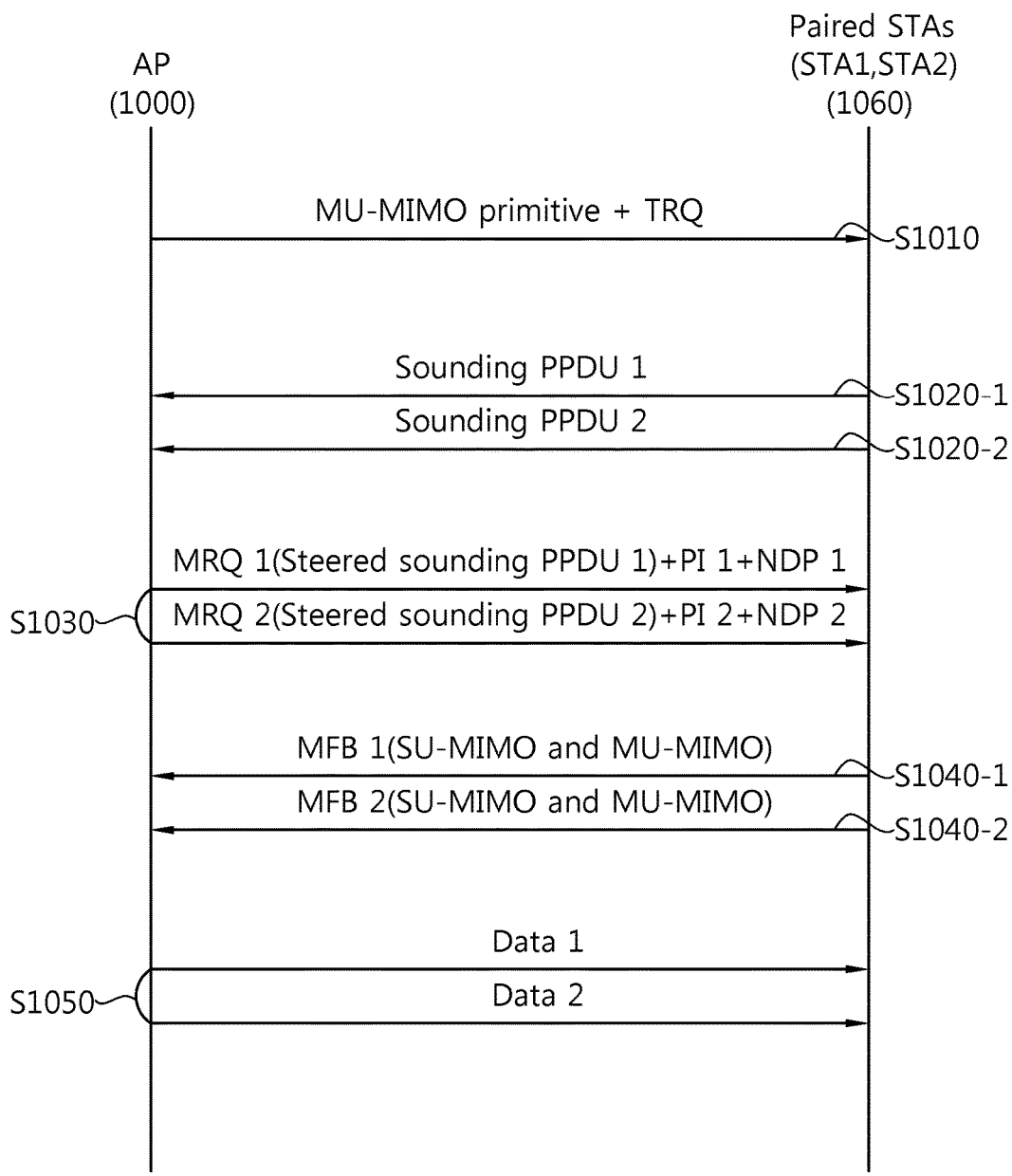
FIG. 10 is a message flow chart of a link adaptation procedure according to an embodiment of the present invention.

FIG. 10 is a message flow chart of the aforementioned link adaptation procedure according to an embodiment of the present invention.

An AP 1000 transmits a MU-MIMO primitive and a TRQ to STAs (i.e., STA 1 and STA 2) 1060 (step S1010). The STA 1 and the STA 2 respectively transmit a sounding PPDU 1 and a sounding PPDU 2 to the AP 1000 in response to the TRQ.

The AP 1000 transmits an MRQ and a PI 1 to the STA 1 and transmits a PI 2 to the STA 2 through MU-MIMO transmission (step S1030). In this case, since an MRQ 1 and an MRQ 2 are transmitted through a steered sounding PPDU, the STA 1 and STA 2 which receive the MRQ 1 and the MRQ 2 cannot know full-dimension channel information, and thus cannot feed back an MCS in an SU-MIMO environment. An NDP frame is additionally transmitted to report full channel information to the STA. An NDP 1 and an NDP 2 may include channel information of all links, or may include information of the remaining links which are not delivered through the steered sounding PPDU.

The STA 1 can determine the number of spatial streams and an MCS suitable for MU-MIMO transmission through the steered sounding PPDU 1 and the PI 1, and can acquire full-dimension channel information by using the NDP 1 (or the NDP and the steered sounding PPDU 1) and determine an MCS suitable for SU-MIMO transmission. Likewise, the STA 2 can determine the number of spatial streams and an MCS suitable for MU-MIMO transmission through the steered sounding PPDU 2 and the PI 2, and can acquire full-dimension channel information by using the NDP 2 (or the NDP and the steered sounding PPDU 1) and determine an MCS suitable for SU-MIMO transmission.

The STA 1 transmits to the AP 1000 an MCS feedback value for a case of assuming SU-MIMO transmission and a case of assuming MU-MIMO transmission by using an MFB 1 (step S1040-1). Likewise, the STA 2 transmits to the AP 1000 an MCS feedback value for a case of assuming SU-MIMO transmission and a case of assuming MU-MIMO transmission by using an MFB 2 (step S1040-2).

The AP 1000 compares a throughput for a case of using SU-MIMO transmission and a case of using MU-MIMO transmission by using the MFB 1 and the MFB 2. If the comparison result shows that a throughput that can be obtained for the case of using MU-MIMO transmission is greater than a throughput that can be obtained for the case of using SU-MIMO transmission, data can be transmitted through MU-MIMO transmission, and otherwise data can be transmitted through SU-MIMO transmission. It is assumed that, in Equation 1 to Equation 2, MU_Tput(STA 1+STA 2) denotes a throughput that can be obtained for a case of performing MU-MIMO transmission to the STA 1 and the STA 2 and SU_Tput(STA X) denotes a throughput that can be obtained for a case of performing SU-MIMO transmission to an STA X. Then, if a condition of Equation 1 is satisfied, the AP may perform MU-MIMO transmission to the STA 1 and the STA 2. Further, if a condition of Equation 2 is satisfied, the AP may perform SU-MIMO transmission to the STA 2. Further, if a condition of Equation 3 is satisfied, the AP may perform SU-MIMO transmission to the STA 3.

$$\text{MU\_}T_{put}(\text{STA1+STA2}) \geq \max(\text{SU\_}T_{put}(\text{STA1}), \text{SU\_}T_{put}(\text{STA2})) \quad \text{[Equation 1]}$$

$$\text{MU\_}T_{put}(\text{STA1+STA2}) < \max(\text{SU\_}T_{put}(\text{STA1}), \text{SU\_}T_{put}(\text{STA2})) \text{ 且 }, \text{SU\_}T_{put}(\text{STA1}) \geq \text{SU\_}T_{put}(\text{STA2}) \quad \text{[Equation 2]}$$

$$\text{MU\_}T_{put}(\text{STA1+STA2}) < \max(\text{SU\_}T_{put}(\text{STA1}), \text{SU\_}T_{put}(\text{STA2})) \text{ 且 }, \text{SU\_}T_{put}(\text{STA1}) > \text{SU\_}T_{put}(\text{STA2}) \quad \text{[Equation 3]}$$

In the example of FIG. 10, a case of satisfying the condition of Equation 1 is exemplified. That is, the AP 1000 transmits the data 1 and the data 2 to the STA 1 and the STA 2 through MU-MIMO transmission.

Figure 11:
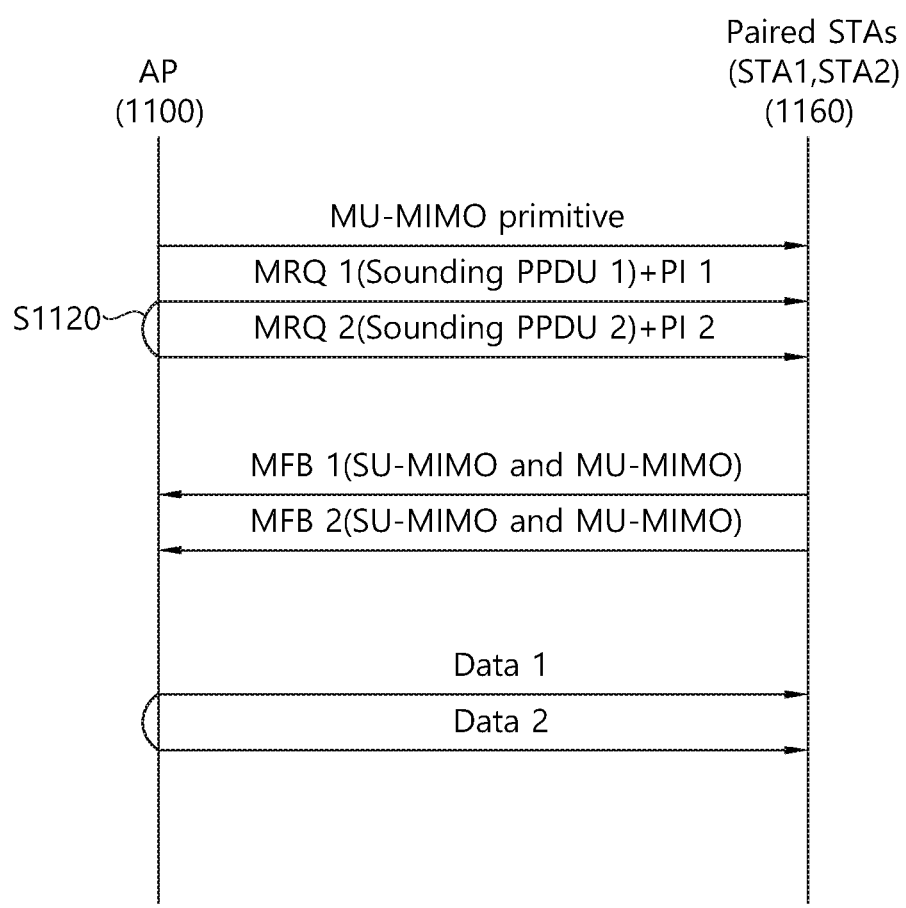
FIG. 11 is a message flow chart of a link adaptation procedure according to an embodiment of the present invention.

FIG. 11 is a message flow chart of a link adaptation procedure according to another embodiment of the present invention.

An example of FIG. 11 is a case in which transmission can be performed using full-dimension channel sounding when an MRQ 1 and an MRQ 2 are transmitted respectively to an STA 1 and an STA 2. That is, since full-dimension channel information is transmitted to the STA 1 and the STA 2 through a sounding PPDU 1 and a sounding PPDU 2 in step S1120, unlike the case of FIG. 10, an NDP may not be additionally transmitted. The remaining operations are the same as in the example of FIG. 10.

Figure 12:
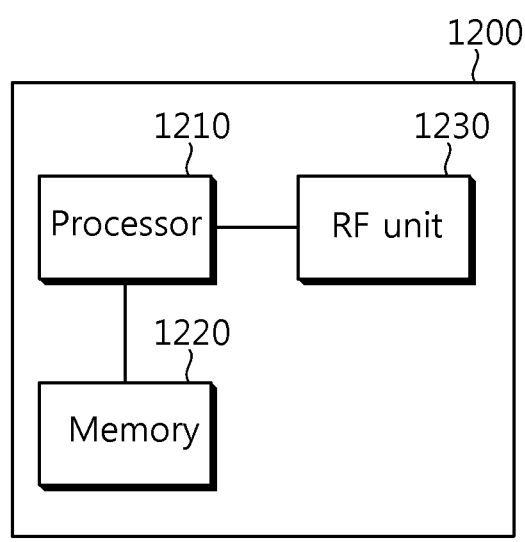
FIG. 12 is a block diagram showing an example of a wireless apparatus according to an embodiment of the present invention.

FIG. 12 is a block diagram showing an example of a wireless apparatus according to an embodiment of the present invention. A wireless apparatus 1200 may be an AP or a non-AP STA.

The wireless apparatus 1200 includes a processor 1210, a memory 1220, and an RF unit 1230. The RF unit 1230 can transmit/receive a radio signal, and can perform MIMO transmission or reception through multiple antennas. The processor 1210 is coupled to the RF unit 1230, and implements a MAC layer and PHY layer of IEEE 802.11. When the processor 1210 handles an operation of the AP among the aforementioned methods, the wireless apparatus 1200 is the AP. When the processor 1210 handles an operation of the STA among the aforementioned methods, the wireless apparatus 1200 is the STA.

The MAC layer of the wireless apparatus implemented by the processor 1210 supports a link adaptation method based on the aforementioned link adaptation protocol, generates a management frame required for implement the aforementioned link adaptation method, and transmits the generated frame to the RF unit 1230 via a PLOP layer and a PMD layer. Each of the MAC layer and PHY layer supporting the link adaptation method according to the present invention can be implemented by the processer in a module form.

The processor 1210 and/or the RF unit 1230 may include an application-specific integrated circuit (ASIC), a separate chipset, a logic circuit, and/or a data processing unit. The memory 1220 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 1220 and may be performed by the processor 1210. The memory 1220 may be located inside or outside the processor 1210, and may be coupled to the processor 1210 by using various well-known means.

Various modifications may be made in the aforementioned embodiments. Although all possible combinations of the various modifications of the embodiments cannot be described, those ordinary skilled in that art will understand possibility of other combinations. Therefore, the present invention is not intended to be limited to the embodiments shown herein but is to be accorded the widest scope consistent with the principles and novel features disclosed herein.

The invention claimed is:

1. A method for a wireless local area network system supporting multi-user multiple-input multiple-output (MU-MIMO), the method comprising:

receiving, by a station (STA), a feedback request from an access point, the feedback request including a request field and a MIMO indicator, the request field indicating a request for a channel feedback, the MIMO indicator including information related to paired STAs that are targets of MU-MIMO scheme together with the STA; and transmitting, by the STA, feedback information to the access point as a response to the feedback request, the feedback information including channel information and stream information, wherein the channel information indicates a recommended modulation and coding scheme (MCS) that is estimated based on the feedback request, and wherein the stream information indicates a number of recommended spatial streams that is estimated based on the feedback request.

2. The method of claim 1, wherein the feedback request is received as a physical layer protocol data unit (PPDU).

3. The method of claim 1, wherein the information in the MIMO indicator indicates a number of allocated spatial streams for the STA.

4. A station (STA) for a wireless local area network system supporting multi-user multiple-input multiple-output (MU-MIMO), the STA comprising:
a radio frequency (RF) unit; and
a processor operatively coupled to the RF unit and configured to:
instruct the RF unit to receive a feedback request from an access point, the feedback request including a request field and a MIMO indicator, the request field indicating a request for a channel feedback, the MIMO indicator including information related to paired STAs that are targets of MU-MIMO scheme together with the STA; and
instruct the RF unit to transmit feedback information to the access point as a response to the feedback request, the feedback information including channel information and stream information,
wherein the channel information indicates a recommended modulation and coding scheme (MCS) that is estimated based on the feedback request, and
wherein the stream information indicates a number of recommended spatial streams that is estimated based on the feedback request.

5. The STA of claim 1, wherein the feedback request is received as a physical layer protocol data unit (PPDU).

6. The STA of claim 1, wherein the information in the MIMO indicator indicates a number of allocated spatial streams for the STA.

7. A method for a wireless local area network system supporting multi-user multiple-input multiple-output (MU-MIMO), the method comprising:

transmitting, by an access point, a feedback request to a station (STA), the feedback request including a request field and a MIMO indicator, the request field indicating a request for a channel feedback, the MIMO indicator including information related to paired STAs that are targets of MU-MIMO scheme together with the STA; and receiving, by the access point, feedback information from the STA as a response to the feedback request, the feedback information including channel information and stream information, wherein the channel information indicates a recommended modulation and coding scheme (MCS) that is estimated by the STA based on the feedback request, and wherein the stream information indicates a number of recommended spatial streams that is estimated by the STA based on the feedback request.

8. The method of claim 7, wherein the feedback request is transmitted as a physical protocol data unit (PPDU).

9. The method of claim 7, wherein the information in the MIMO indicator indicates a number of allocated spatial streams for the STA.

10. A device for a wireless local area network system supporting multi-user multiple-input multiple-output (MU-MIMO), the device comprising:
a radio frequency (RF) unit; and
a processor operatively coupled to the RF unit and configured to:
instruct the RF unit to transmit a feedback request to a station (STA), the feedback request including a request field and a MIMO indicator, the request field indicating a request for a channel feedback, the MIMO indicator including information related to paired STAs that are targets of MU-MIMO scheme together with the STA; and
instruct the RF unit to receive feedback information from the STA as a response to the feedback request, the feedback information including channel information and stream information,
wherein the channel information indicates a recommended modulation and coding scheme (MCS) that is estimated by the STA based on the feedback request, and
wherein the stream information indicates a number of recommended spatial streams that is estimated by the STA based on the feedback request.

11. The device of claim 1, wherein the feedback request is received as a physical protocol data unit (PPDU).

12. The device of claim 1, wherein the information in the MIMO indicator indicates a number of allocated spatial streams for the STA.

* * * * *